April 2, 1963 S. DE JONG 3,083,982
VEHICLE FRONT SUSPENSION SYSTEM
Filed Dec. 7, 1960 2 Sheets-Sheet 1

INVENTOR.
SIJTZE DE JONG
BY
Dale A. Winnie
ATTORNEY

April 2, 1963 S. DE JONG 3,083,982
VEHICLE FRONT SUSPENSION SYSTEM
Filed Dec. 7, 1960 2 Sheets-Sheet 2

INVENTOR.
SIJTZE DE JONG
BY
Dale A. Winnie
ATTORNEY

United States Patent Office 3,083,982
Patented Apr. 2, 1963

3,083,982
VEHICLE FRONT SUSPENSION SYSTEM
Sijtze de Jong, Marion, Ohio, assignor to Curtiss-Wright Corporation, South Bend, Ind., a corporation of Delaware
Filed Dec. 7, 1960, Ser. No. 74,298
8 Claims. (Cl. 280—112)

This invention relates to vehicle suspension systems in general and more particularly to front suspension systems for heavy-duty off-highway vehicles.

Most off-highway vehicles use one of two different front suspension systems. One of the systems includes having the front axle suspended below the vehicle frame by means of two longitudinally disposed leaf-springs and having the axle located transversely and longitudinally by the springs or suitable locating rods. The other commonly used suspension system has the front axle supported on a transversely disposed leaf-spring. In the latter system the axle is usually located in a longitudinal direction by means of an A-frame and in a transverse direction by the leaf-spring.

In the first of the two suspension systems mentioned, wherein longitudinally disposed leaf-springs are used, the front wheels have very little freedom to follow irregularities in the terrain over which the vehicle is required to travel and a very rough ride is obtained. Furthermore, clearance problems between the front suspension assembly and the vehicle engine usually require a drop center axle and a consequent loss of ground clearance.

The suspension system which uses the transversely disposed leaf-spring allows more freedom of transverse axle oscillation; particularly where the leaf-spring is pinned centrally to a frame cross member. However, the stiffness required of the transversely disposed leaf-spring usually results in poor riding characteristics. In addition, the same ground clearance problem requiring a drop center axle or loss of ground clearance is usually involved.

It is an object of this invention to teach a front suspension system which is particularly adaptable for heavy-duty off-highway vehicles and which provides an improved riding quality not heretofore obtained by other front suspension systems.

It is also an object of this invention to teach a front suspension system which makes use of a straight axle beam while providing ample clearance between the suspension unit and the vehicle driving engine for any foreseeable contingency.

Another object of this invention is to teach a front suspension system which affords an increase in the ground clearance under the suspension unit.

A further object of this invention is to teach a suspension system affording improved performance over previously known suspension systems used for like purposes.

These and other objects and advantages to be obtained in the practice of this invention will be more apparent upon a reading of the following specification, in regard to a preferred embodiment of the invention, in conjunction with the accompanying drawings.

Figure 5:
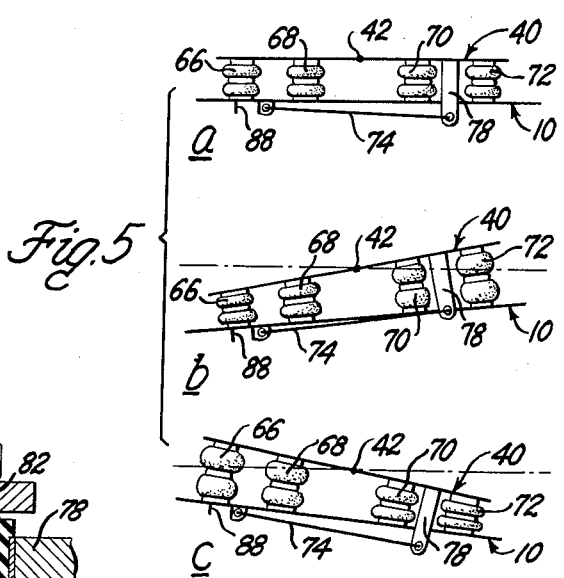

FIGURE 5 includes three schematic views (a), (b) and (c) of different suspension system arrangements.

The front suspension system of this invention, in brief, includes a straight axle beam connected by air springs to a walking beam member that is in turn pivotally engaged between the cross members of a vehicle frame. The axle beam is longitudinally restrained by trailing arms which are hinged to the vehicle frame. It is transversely restrained by locating arms having one end engaged to the axle beam and the other end engaged to the walking beam in a manner affording horizontally disposed vertical travel of the axle beam. The axle beam is free to oscillate with the walking beam as permitted by the air springs. It is also free for vertical oscillation as permitted by the air springs and dampened by shock absorbers connected between the walking beam and axle beam members.

Referring to the drawings in further detail:

The axle beam 10 comprises a flat plate 12 having side flanges 14 and 16 secured thereto to form a straight H-section axle beam. Mounting blocks 18 are provided on the ends of the axle beams to receive the king pin assembly 20 which supports the stearing knuckles 22 of the wheels 24.

A tie rod 26 connects the steering knuckles 22 of the respective wheels 24. Separate power cylinders 28 are provided between the axle beam and the steering knuckles to afford steering control.

Figure 1:
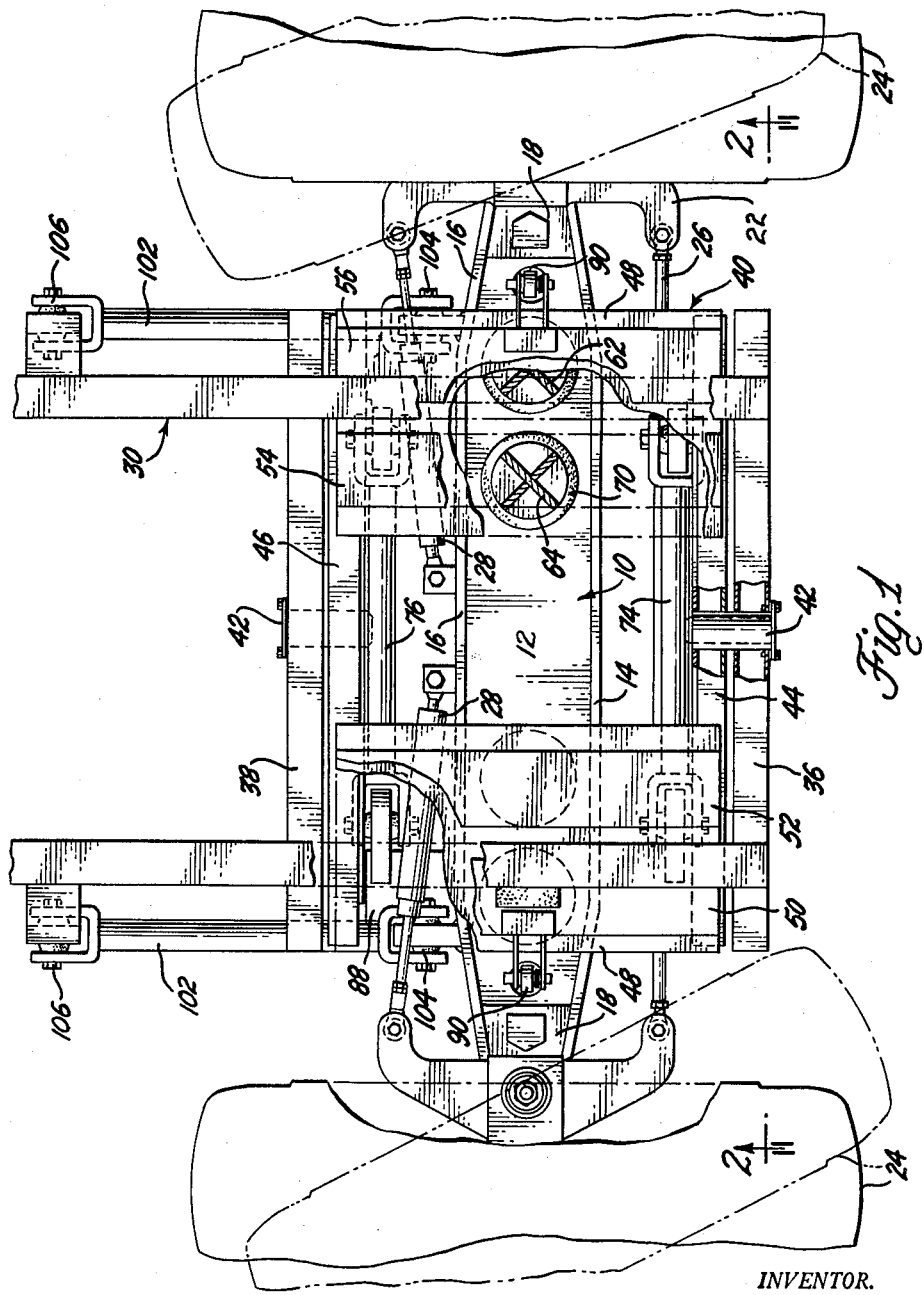
FIGURE 1 is a top elevational view of the suspension system of this invention showing certain parts broken away, and others in cross-section, to better illustrate certain features which would not otherwise be readily apparent.
Figure 2:
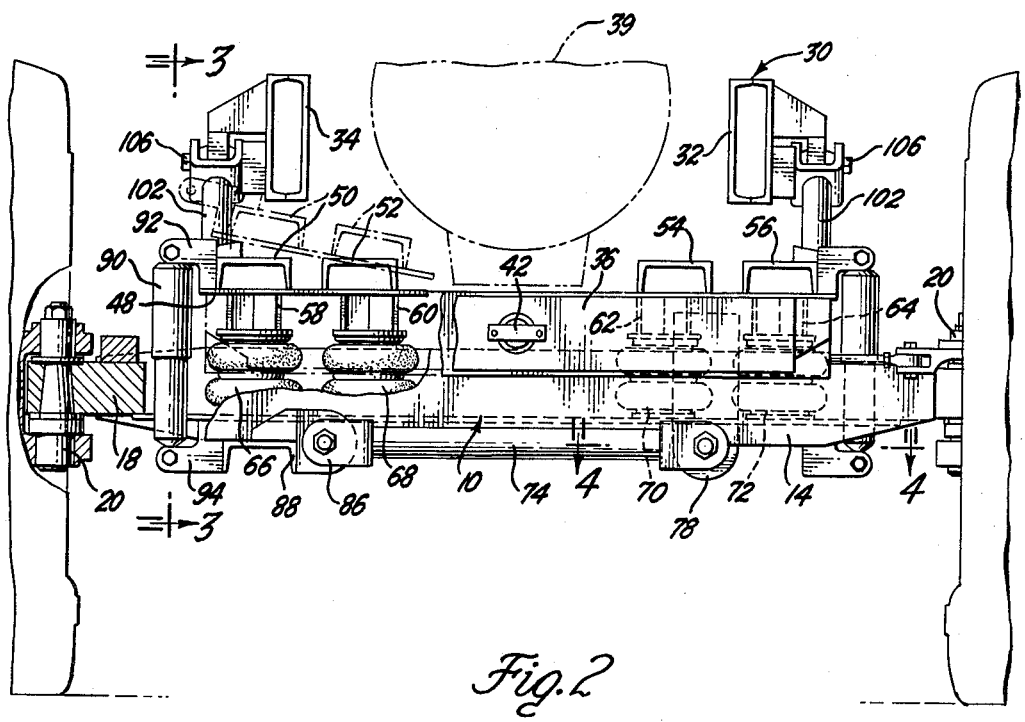
FIGURE 2 is a front view of the front suspension system of this invention with certain parts broken away for better illustration thereof.
Figure 3:
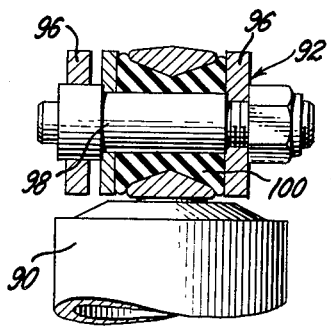
FIGURE 3 is an enlarged fragmentary view of the shock absorber mounting as seen in FIGURE 2, in the plane of line 3—3 and looking in the direction of the arrows thereon.

The axle beam 10 is disposed across and underneath the front end of the vehicle frame 30. The vehicle frame 30 includes side rails 32 and 34 and a pair of cross frame members 36 and 38 disposed in relative parallel spaced relation therebetween. The means by which the cross frame rails 36 and 38 are secured to the side rails 32 and 34 has not been shown. However, it is to be understood that the frame members 36 and 38 are a part of the vehicle frame 30 and are arranged to pass under the vehicle engine 39 which is shown schematically and in phantom outline in FIGURE 2.

The walking beam structure 40 is disposed between the frame cross member 36 and 38 and is engaged thereto by pivot pin connections 42 to permit oscillation thereof about the centerline of the vehicle frame.

The walking beam member 40 includes parallel spaced frame members 44 and 46 having plate members 48 secured between adjacently disposed ends thereof. Stiffening members 50 and 52 are secured to one of the plate members 48, between the ends of the walking beam frame members 44 and 46, and similar stiffening members 54 and 56 are secured to the other plate member 48 between the other ends of the walking beam frame members.

On the underside of the walking beam 40 are provided air spring mounting fixtures 58, 60, 62 and 64. Air springs 66, 68, 70 and 72 are secured to the fixtures last mentioned and the axle beam 10. The air springs 66 and 68 are disposed on one side of the centerline of the walking beam 40 and the other air springs 70 and 72 are disposed on the other side thereof. Thus, the air springs are in pairs and are relatively aligned.

The walking beam member 40 is restrained against transverse movement by the pivot pin connections 42 to the vehicle frame.

Figure 4:
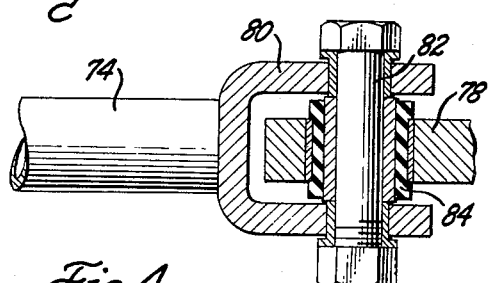
FIGURE 4 is an enlarged fragmentary view of the transverse locating rod arrangement as seen in FIGURE 2 in the plane of line 4—4, looking in the direction of the arrows thereon.

The axle beam 10 is located against transverse movement by transverse locating rods 74 and 76. Such locating rods 74 and 76 have one end pivotally secured to a depending bracket 78 secured to the walking beam 40. The yoke end 80 is secured to the bracket 78 by a pivot pin 82 as is best shown by FIGURE 4. A rubber bushing 84 is disposed about the pivot pin 82 to permit limited relative flexure and vibration isolation. The other end of the locating rods 74 and 76 include a swivel connection 86 secured to a cross beam 88 engaged to the axle beam 10.

The transverse locating rods 74 and 76 are both secured to the walking beam 40 on one side thereof and extend across the centerline for engagement with the cross member of the axle beam 10. Accordingly, the axle beam 10 is afforded relative freedom of movement with respect to the walking beam 40 within the arc permitted by the locating rods 74 and 76 and is retained in substantial parallel relation to the walking beam by the air springs 66, 68, 70 and 72; though not restricted to a relative parallel disposition.

The schematic illustrations of FIGURE 5 show the walking beam 40 and wheel supporting axle beam 10 in different relative positions. FIGURE 5(a) shows the air springs 66, 68, 70 and 72 substantially equally compressed so that the axle beam 10 is in a closer relative position to the walking beam member 40. In FIGURE 5(b) the walking beam and axle members are tilted in one transverse direction and the air springs 66 and 68 are more compressed than the other air springs 70 and 72 such that the axle beam 10 and walking beam member 40 are no longer in the same relative parallel relation. The reverse situation, with the suspension system inclined in the other direction, is shown by FIGURE 5(c).

The schematic illustrations show the relative freedom afforded the suspension system, as a whole, and the relative freedom afforded the axle beam 10 as regards the walking beam 40. The relative stiffness of the system is of course dependent upon the air spring bag pressures, shock absorber mountings, etc. which is built into the system.

In the disclosed suspension system, shock absorbers 90 are mounted between the axle beam 10 and the walking beam 40. The shock absorbers are connected to a bracket 92 provided on the walking beam 40 and a similar mounting bracket 94 provided on the axle beam 10. The mounting brackets 92 and 94 include a swivel yoke 96 receptive of a pivot pin 98 and flexible bushing connection 100. This arrangement permits limited relative lateral freedom between the axle beam 10 and walking beam member 40 as required by the freedom of the axle beam 10 within the arc of the transverse locating rods 74 and 76 while the walking beam 40 is restrained by its pivotal connection 42 to the frame cross members 36 and 38.

The axle beam 10 is located longitudinally of the vehicle frame 30 by means of trailing arms 102. The trailing arms 102 are connected to the axle beam 10 by swivel connections 104 and to the vehicle frame by similar connections 106. In the present instance such trailing arms are shown as engaged directly to the vehicle frame side rails 32 and 34. However, this is intended to illustrate the connection to the vehicle frame 30 and is not intended as restrictive to having the trailing arms 102 inclined rather than horizontally disposed.

The trailing arms 102 restrict the movement of the axle beam 10 to substantially vertical movement; though actually within the arc permitted by the trailing arm. The air spring and flexible shock mounting enables the minimum longitudinal relative movement required between the walking beam 40 and axle beam 10.

The disclosed suspension system thus comprises a walking beam structure 40 that is free to oscillate about its pivotal connection to the vehicle frame and is restrained longitudinally and transversely by its pivotal connection to the frame. The wheel supporting axle beam 10 is restrained against lateral movement by the transverse locating rods 74 and 76 and is restrained longitudinally by the trailing arms 102. At the same time, the axle beam is afforded vertical movement by the air springs 66, 68, 70 and 72 and the same relative freedom of oscillatory movement afforded the walking beam 40, by its engagement thereto.

I claim:
1. A vehicle suspension system, comprising: a vehicle frame including spaced cross frame members, a walking beam member disposed between and pivotally connected to said cross frame members, a vehicle wheel supporting axle beam, suspension spring means connecting said axle beam to said walking beam, transverse locating means provided between said axle and walking beam members, and longitudinal locating means provided between said axle beam and said vehicle frame.

2. A vehicle suspension system, comprising: a vehicle frame including spaced cross frame members, a walking beam member disposed between and pivotally connected to said cross frame members, a vehicle wheel supporting axle beam, suspension spring means provided between and connected to said axle and walking beams on opposite sides of the pivotal connection of said walking beam to said vehicle frame, transverse locating means provided between said axle and walking beam members, and longitudinal locating means provided between said axle beam and said vehicle frame.

3. A vehicle suspension system, comprising: a vehicle frame including spaced cross frame members, a walking beam member disposed between and pivotally connected to said cross frame members, a vehicle wheel supporting axle beam, suspension spring means connecting said axle beam to said walking beam, transverse locating members laterally disposed between and pivotally connected to said axle and walking beams on respectively opposite sides of the pivotal connection of said walking beam to said frame cross members, and trailing arm members pivotally connected to and disposed between said axle beam and vehicle frame for longitudinal location of said axle beam.

4. A vehicle suspension system, comprising: a vehicle frame having laterally disposed and relatively spaced frame cross members provided near the front end thereof, a walking beam member received between and within the plane of said frame cross members, means pivotally connecting said walking beam member to said frame cross members for oscillation about the centerline of said vehicle frame, a vehicle wheel supporting axle beam member, air bag suspension means provided between and connected to said axle and walking beam members, said suspension means including at least two air bags aligned and disposed on relatively opposite sides of said pivotal connecting means, transverse locating means provided between said axle and walking beam members, and longitudinal locating means provided between said walking beam and said vehicle frame.

5. A vehicle suspension system, comprising: a vehicle frame including spaced cross frame members, a walking beam member disposed between and pivotally connected to said cross frame members, a vehicle wheel supporting axle beam, suspension spring means connecting said axle beam to said walking beam, transverse locating members laterally disposed between and having opposite ends thereof pivotally connected to said axle and walking beam members, said transverse locating members extending across the centerline of said vehicle frame near each of said frame cross members and having adjacently disposed ends connected to respectively the same of said axle and walking beam members, and trailing arm members pivotally connected to said axle beam member and to said vehicle frame member at each side thereof for longitudinal location of said axle beam.

6. A vehicle suspension system, comprising: a walking beam member disposed transversely of a vehicle frame and between spaced cross frame members thereof, means pivotally connecting said walking beam member to said frame cross members intermediate the ends thereof, a wheel supporting straight axle beam disposed transversely of said walking beam member and in spaced relation thereunder, suspension spring means engaging said walking beam and axle beam together and disposed on opposite sides of the pivotal connection of said walking beam to said vehicle frame, separate spaced locating means having respective ends engaged to said walking beam and axle beam for transverse location of said axle beam relative to said walking beam, and trailing arm connections engaged to said axle beam and extended for engagement with said frame member for longitudinal location of said axle beam.

7. A vehicle suspension system, comprising: a vehicle frame having laterally disposed and relatively spaced frame cross members provided near the front end thereof, a walking beam member received between and within the plane of said frame cross members, means pivotally connecting said walking beam member to said frame cross members for oscillation about the centerline of said vehicle frame, a vehicle wheel supporting axle beam member, air bag suspension means provided between and connected to said axle and walking beam members, said suspension means including at least two air bags aligned and disposed on relatively opposite sides of said pivotal connecting means, shock absorbing members connected between said axle and walking beam members, transverse locating members laterally disposed between and having opposite ends thereof pivotally connected to said axle and walking beam members, said transverse locating members extending across the centerline of said vehicle frame near each of said frame cross members and having adjacently disposed ends connected to respectively the same of said axle and walking beam members, and trailing arm members pivotally connected to said axle beam member and to said vehicle frame member at each side thereof for longitudinal location of said axle beam.

8. A vehicle suspension system, comprising: a vehicle frame having a walking beam member disposed transversely and within the plane thereof, means pivotally connecting said walking beam to said frame for oscillation about an axis substantially coincident with the center-line of said frame, a vehicle wheel supporting axle beam disposed transversely across said frame and aligned under said walking beam, suspension spring means connecting said axle beam to said walking beam, transverse locating means including an arm member having one end thereof connected to said walking beam, said walking beam including a depending bracket having said other arm member end pivotally connected thereto for permitting relative oscillation between said walking beam and axle beam, and means operatively disposed and connected between said frame and axle beam for longitudinal location of said axle beam.

References Cited in the file of this patent

UNITED STATES PATENTS

| | | |
|---|---|---|
| 1,095,137 | Bailey | Apr. 28, 1914 |
| 1,551,798 | Bugatti | Sept. 1, 1925 |
| 2,190,368 | Morgan | Feb. 13, 1940 |